United States Patent [19]

Claussen

[11] Patent Number: 4,519,935
[45] Date of Patent: May 28, 1985

[54] LIQUID-CRYSTALLINE MATERIAL CONTAINING AZO DYESTUFFS

[75] Inventor: Uwe Claussen, Leverkusen, Fed. Rep. of Germany

[73] Assignee: Bayer Aktiengesellschaft, Leverkusen, Fed. Rep. of Germany

[21] Appl. No.: 643,752

[22] Filed: Aug. 23, 1984

Related U.S. Application Data

[63] Continuation of Ser. No. 382,547, May 26, 1982, abandoned.

[30] Foreign Application Priority Data

Jun. 13, 1981 [DE] Fed. Rep. of Germany ....... 3123519

[51] Int. Cl.$^3$ ............................ C09K 3/34; G02F 1/13
[52] U.S. Cl. .................................... 252/299.1; 350/349
[58] Field of Search ....................... 252/299.1; 350/349

[56] References Cited

U.S. PATENT DOCUMENTS

| | | | |
|---|---|---|---|
| 4,122,027 | 10/1978 | Cole, Jr. et al. | 252/299.1 |
| 4,128,497 | 12/1978 | Cole, Jr. et al. | 252/299.1 |
| 4,137,193 | 1/1979 | Osman et al. | 252/299.1 |
| 4,145,114 | 2/1979 | Coates et al. | 252/299.1 |
| 4,179,395 | 12/1979 | Cole, Jr. et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,164 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |
| 4,394,070 | 7/1983 | Brown et al. | 252/299.1 |
| 4,426,312 | 1/1984 | Claussen | 252/299.1 |

FOREIGN PATENT DOCUMENTS

58-111884  7/1983  Japan ................. 252/299.1

OTHER PUBLICATIONS

Demus, D. et al., Flüssige Kristalle in Tabellen, Veb Deutscher Verlag, Leipzig, pp. 220-221, (1974).
Cox, R. J., Mol. Cryst. Liq. Cryst., vol. 55, pp. 1-32, (1979).
Blinov, L. M. et al., J. de Physique, Coll. C1, Suppl. No. 3, Tome 36, pp. C1-69-76, (1975).
Bloom, A. et al., Mol. Cryst. Liq. Cryst., vol. 40, pp. 213-221, (1977).
Cognard, J. et al., Mol. Cryst. Liq. Cryst., vol. 68, pp. 207-229, (1981).
Molecular Crystals & Liquid Crystals, vol. 55, No. 9, 1979, Gordon and Breach Science Publishers, Inc. London (GB), R. J. Cox.
"Liquid Crystal Guest-Host Systems: pp. 1-32, p. 8, paragraphs 4-16.

*Primary Examiner*—Teddy S. Gron
*Attorney, Agent, or Firm*—Sprung Horn Kramer & Woods

[57] ABSTRACT

Liquid-crystalline material containing an azo dyestuff of the formula

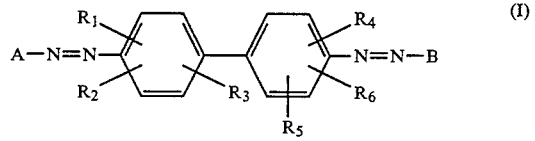

in which

A and B are radicals of coupling components in particular of the benzene, naphthalene and pyrazole series and $R_1$, $R_2$, $R_3$, $R_4$, $R_5$ and $R_6$ are hydrogen, halogen, trifluoromethyl, nitro, alkyl, alkoxy, alkylthio, alkylcarbonyl or alkoxycarbonyl with the proviso that at least one of the radicals $R_1$–$R_6$ is different from hydrogen and at least two designate hydrogen.

10 Claims, No Drawings

LIQUID-CRYSTALLINE MATERIAL CONTAINING AZO DYESTUFFS

This is a continuation of application Ser. No. 382,547, filed 5/26/82, now abandoned.

The invention relates to a liquid-crystalline material which contains azo dyestuffs. The liquid-crystalline material is used in displays.

Displays is here understood as meaning electro-optical display elements which as a rule consist of 2 parallel plates which are located a distance of 5–50μ apart and of which at least one is made from transparent material. Electrodes are fixed on the inward-looking faces of the plates, and the space between the plates is filled with a dyestuff-containing, liquid-crystalline material. The structure and the manufacture of an electro-optical display is known (Kelker and Hatz, Handbook of Liquid Crystals, page 611 et seq.; 1980).

It is also known that it is possible to embed in the liquid-crystalline material selected dyestuffs which follow the changes in orientation and order effected in the liquid-crystalline material by an externally applied field (guest-host interaction). This particular property makes suitable dyestuffs rare when, apart from the dichroic properties mentioned, there is an additional demand for fastness properties which make possible commercial exploitation of the effect. Important prerequisites for commercial exploitation are the light-fastness, an adequate solubility and the compatibility with other dyestuffs.

The literature describes numerous suitable single dyestuffs. Thus, azo dyestuffs have also been mentioned frequently (R. J. Cox: *Mol. Crystals Liquid Crystals,* 1979, pages 1–32).

In general, these azo dyestuffs have a high order parameter. However, the colour intensities are rarely adequate, and as a rule the light-fastness is too low. As a consequence of this insight the emphasis in the development of useful dyestuffs has shifted to the family of the anthraquinones (see, for example, German Offenlegungsschrift No. 3,028,593, German Offenlegungsschrift No. 3,009,974 and German Offenlegungsschrift No. 3,006,744).

It has now been found, surprisingly, that azo dyestuffs of the formula

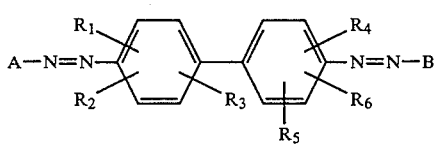

are highly suitable for use in liquid-crystalline material. They have an excellent light-fastness, and are very intensely coloured and readily soluble.

In the formula (I):

A and B designate radicals of coupling components of the aromatic or heterocyclic series, $R_1$, $R_2$, $R_3$, $R_4$, $R_5$ and $R_6$ designate hydrogen, halogen, trifluoromethyl, nitro, alkyl, alkoxy, alkylthio, alkylcarbonyl or alkoxycarbonyl, with the proviso that at least one of the radicals $R_1$–$R_6$ is different from hydrogen and at least two designate hydrogen, and A and B represent, for example, radicals of coupling components of the benzene, naphthalene or pyrazole series.

Liquid-crystalline material is preferred which contains a compound of the formula

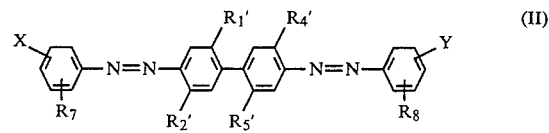

in which $R_1'$, $R_2'$, $R_4'$ and $R_5'$ designate hydrogen, halogen, trifluoromethyl, nitro, alkyl, alkoxy, alkylthio, alkylcarbonyl or alkoxycarbonyl, with the proviso that at least one of these radicals is different from hydrogen.

$R_7$ and $R_8$ designate hydrogen, halogen, cyano, nitro, alkyl or alkoxy and

X represents —$OR_9$, —$SR_9$ or

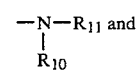

Y represents —$OR_{12}$, —$SR_{12}$ or

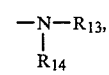

wherein $R_9$, $R_{10}$, $R_{11}$, $R_{12}$, $R_{13}$ and $R_{14}$ designate hydrogen, optionally substituted alkyl, optionally substituted cycloalkyl, optionally substituted aryl, optionally substituted aralkyl or acyl, and $R_{10}$ and $R_{11}$ or $R_{13}$ and $R_{14}$ together with the inclusion of the N atom can form a 5-membered to 8-membered ring.

Also preferred for use in liquid-crystalline material are compounds of the formula

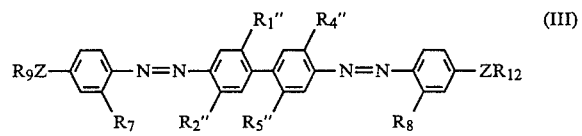

in which

Z designates an O or S atom, $R_1''$, $R_2''$, $R_4''$ and $R_5''$ designate hydrogen, halogen, in particular chlorine, $C_1$–$C_4$-alkyl, in particular methyl, and $C_1$–$C_4$-alkoxy, in particular methoxy, with the proviso that either $R_1''$ and $R_5''$ or $R_2''$ and $R_4''$ denote hydrogen and $R_7$, $R_8$, $R_9$ and $R_{12}$ have the meaning specified for the formula (II).

In the substituents of the formulae (I) and (II), halogen preferably designates chlorine, bromine and fluorine, alkyl preferably designates $C_1$–$C_6$-alkyl, alkoxy preferably designates $C_1$–$C_6$-alkoxy, alkylthio preferably designates $C_1$–$C_6$-alkylthio, in particular methylthio, alkylcarbonyl preferably designates ($C_1$–$C_6$-alkyl)-carbonyl and alkoxycarbonyl preferably designates ($C_1$–$C_6$-alkoxy)-carbonyl.

$R_9$, $R_{10}$, $R_{11}$, $R_{12}$, $R_{13}$ and $R_{14}$ preferably represent hydrogen, $C_1$–$C_6$-alkyl, cyclopentyl, cyclohexyl, phenyl, naphthyl, benzyl or phenethyl, wherein the hydrocarbon radicals mentioned for $R_9$, $R_{10}$ and $R_{11}$ can be substituted, as well as acyl.

Compounds employed particularly preferably are of the formula

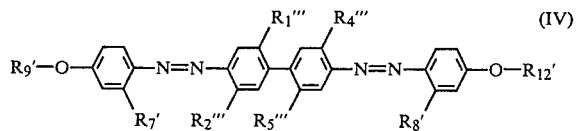

in which
R$_1'''$, R$_2'''$, R$_4'''$ and R$_5'''$ designate halogen, in particular chlorine, hydrogen, C$_1$-C$_4$-alkyl, in particular methyl, or C$_1$-C$_4$-alkoxy, in particular methoxy, with the proviso that at least one, but preferably two, of phase substituent differ(s) from hydrogen and
R$_9'$ and R$_{12}'$ designate C$_1$-C$_4$-alkyl, in particular methyl, benzyl which can be substituted by halogen, in particular chlorine, nitro, C$_1$-C$_4$-alkyl, in particular methyl, or by C$_1$-C$_4$-alkoxy, in particular methoxy, or optionally substituted aminocarbonyl and
R$_7'$ and R$_8'$ represent hydrogen, halogen, in particular chlorine, C$_1$-C$_4$-alkyl, in particular methyl, or C$_1$-C$_4$-alkoxy, in particular methoxy. Compounds employed very particularly preferably are of the formula (IV) in which R$_1'''$=R$_5'''$ and/or R$_2'''$=R$_4'''$.

Compounds also used preferably are of the formula

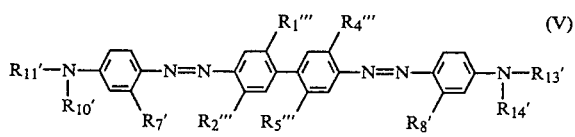

in which
R$_1'''$, R$_2'''$, R$_4'''$, R$_5'''$, R$_7'$ and R$_8'$ have the meaning specified for the formula (IV) and R$_{10}'$, R$_{11}'$, R$_{13}'$ and R$_{14}'$ represent hydrogen, C$_1$-C$_4$-alkyl which can be substituted by hydroxyl, cyano, phenoxy, C$_1$-C$_4$-alkoxy or by (C$_1$-C$_4$-alkoxy)-carbonyloxy, cyclohexyl, phenyl, naphthyl, benzyl, phenethyl, (C$_1$-C$_4$-alkyl)-carbonyl, benzoyl, (C$_1$-C$_4$-alkylamino)-carbonyl or phenylaminocarbonyl, or R$_{10}'$ and R$_{11}'$ or R$_{13}'$ and R$_{14}'$ together with the inclusion of the N atom can form a 5-membered or 6-membered ring.

Compounds employed very particularly preferably are of the formula (V) in which R$_1'''$=R$_5'''$ and/or R$_2'''$=R$_4'''$.

The dyestuffs to be used according to the invention are known or they can be prepared by methods described in the literature. The dyestuffs of the formula (I) obtained in the customary syntheses by diazotisation and coupling as a rule are not sufficiently pure for use in displays. It has therefore proved advantageous to purify these dyestuffs by chromatographic methods, preferably column or partition chromatography.

The dyestuffs according to the invention can be used as solutions in liquid-crystalline materials. The use of mixtures of dyestuffs is preferred. Suitable liquid-crystalline materials are in particular those which have positive dielectric antisotropy. The number of mixture variants is large. Examples which may be mentioned are mixtures of 4-(4-cyanophenyl)-alkylcyclohexanes, wherein alkyl denotes propyl (25%), n-pentyl (37%) and n-heptyl (25%) and 4-(4'-cyanobiphenyl)-n-pentylcyclohexane (12%) is used as an additional component, and mixtures of 4-(4'-cyanobiphenyl)-alkyl and -alkoxy compounds, for example with a meaning for alkyl of n-pentyl (53%) and n-heptyl (25%) and for alkoxy of n-octyloxy (14%), and 4-(4'-cyanoterphenyl)-alkyl compounds, alkyl representing, for example, n-pentyl (8%). Mixtures containing 4-cyanophenylpyrimidines are also suitable. The liquid-crystalline material contains the dyestuffs in accordance with the formula I in an amount which is advantageously from about 0.01 to about 10% by weight, particularly preferably from about 0.5 to about 5% by weight.

The dyestuffs dissolved in the liquid-crystalline materials and their mixtures with other dyestuffs, in particular with anthraquinone dyestuffs, can be used in electro-optical displays.

EXAMPLE 1

3.5 g of 4,4-diamino-2,2'-dimethylbiphenyl sulphate are dissolved in 200 ml of H$_2$O and 20 ml of concentrated hydrochloric acid and diazotised at 0°-5° C. by the addition of 3.5 g of NaNO$_2$ in 50 ml of H$_2$O. After the diazotisation is complete, a coupling reaction to 8.3 g of N,N-dimethyl-3-nitroaniline is carried out and the pH value of the reaction mixture is maintained at 5.5 by the addition of sodium acetate solution. After 2.5 hours, the solids are filtered off with suction, and the residue is washed with water and recrystallized from chlorobenzene with the addition of alumina and subsequently from n-butanol. Yellow crystals are obtained.

The dyestuff is dissolved in a nematic phase (TLI 1132, Messrs. Merck) which is a mixture of substituted phenylcyclohexanes and the dichroism is measured. For this purpose, the solution is transferred to a cell the walls of which have been coated with an orientation layer and are plane-parallel a distance of 20μ apart. The absorption is measured with polarised light by setting the polarising filter in such a way that maximum absorption (A $\parallel$) is obtained. Relative to this measured value the minimum absorption is then obtained by turning the filter by 90°. The order parameter is calculated from the known equation $$S = \frac{\frac{A\parallel}{A\perp} - 1}{\frac{A\parallel}{A\perp} + 2}$$

For the present compound S=0.72.

The compounds listed in the tables which follow are also highly suitable, analogously to Example 1, for use as dyestuffs in liquid-crystalline phases.

TABLE 1

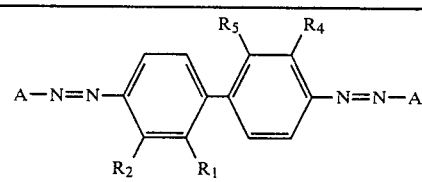

| A | R$_1$ | R$_2$ | R$_4$ | R$_5$ | Order parameter S |
|---|---|---|---|---|---|
| Cl-⌬-CH$_2$-O-⌬- | Cl | Cl | Cl | Cl | 0.67 |
| " | CH$_3$ | H | H | CH$_3$ | 0.75 |
| " | Cl | H | H | Cl | 0.73 |
| " | H | Cl | Cl | H | 0.70 |
| " | H | OCH$_3$ | OCH$_3$ | H | 0.70 |

TABLE 1-continued

Structure: A—N=N—[phenyl with R5, R2, R1]—[phenyl with R4]—N=N—A

| A | R1 | R2 | R4 | R5 | Order parameter S |
|---|---|---|---|---|---|
| 3-Cl-4-(H₃CO)-phenyl (methyl) | H | Cl | Cl | H | 0.66 |
| (HOC₂H₄)₂N-phenyl- | CH₃ | H | H | CH₃ | 0.68 |
| (C₂H₅)₂N-phenyl- | CH₃ | H | H | CH₃ | 0.70 |
| cyclohexyl-NH-phenyl- | Cl | Cl | Cl | Cl | 0.63 |
| benzyloxy-nitro-phenyl (PhCH₂O, NO₂) | Cl | H | H | Cl | 0.69 |
| Ph-CO-NH-phenyl- | Cl | H | H | Cl | 0.73 |
| H₂N-(CH₃,CH₃,Cl)-phenyl | CH₃ | H | H | CH₃ | 0.71 |

TABLE 2

Structure: X—[phenyl with R7]—N=N—[phenyl with CH₃]—[phenyl]—N=N—[phenyl with R8]—Y

| X | Y | R7 | R8 | Shade |
|---|---|---|---|---|
| (CH₃)₂N— | (CH₃)₂N— | Cl | Cl | orange |
| (n-C₃H₇)₂N— | Ph-CH₂O— | H | H | yellow-orange |
| cyclohexyl- | Ph-NH— | OCH₃ | H | yellow |
| Ph-N(CH₃)— | (CH₃)₂N— | H | H | yellow-orange |
| Ph-CH₂O— | Ph-CH₂O— | H | H | yellow |
| CH₃O— | (CNC₂H₄)₂N— | Cl | H | yellow |

TABLE 3

Structure: X—[phenyl with R7]—N=N—[phenyl with H₃C]—[phenyl with CH₃]—N=N—[phenyl with R8]—Y

| X | Y | R7 | R8 | Shade |
|---|---|---|---|---|
| (CH₃)₂N— | (C₂H₅)₂N— | H | CH₃ | orange |
| (n-C₃H₇)₂N— | (C₂H₅)₂N— | H | CH₃ | " |
| (n-C₄H₉)₂N— | (NCCH₂CH₂)₂N— | H | H | " |
| n-C₄H₉NH— | n-C₄H₉—NH— | CH₃ | CH₃ | " |
| (C₂H₅)₂N— | (C₂H₅)₂N— | OCH₃ | OCH₃ | " |
| (C₂H₅)₂N— | CH₃O— | OCH₃ | OCH₃ | orange-yellow |
| CH₃S— | CH₃O— | H | H | yellow |
| Ph-NHCONH— | Ph-NHCONH— | H | H | yellow |
| cyclohexyl-NHCONH— | cyclohexyl-NHCONH— | H | H | yellow |
| O₂N-Ph-CH₂O— | O₂N-Ph-CH₂O— | H | H | yellow |
| H₃C-Ph-CH₂O— | H₃C-Ph-CH₂O— | H | H | yellow |
| CH₃O— | CH₃O | CH₃ | CH₃ | yellow |
| Ph-CH₂O— | Ph-CH₂O— | H | H | yellow |

TABLE 4

Structure: X—(phenyl with R7)—N=N—(phenyl with H3CO)—(phenyl with OCH3)—N=N—(phenyl with R8)—Y

| X | Y | R₇ | R₈ | Shade |
|---|---|---|---|---|
| $(C_2H_5)_2N-$ | $(C_2H_5)_2-N-$ | H | H | red-orange |
| $(n-C_3H_7)_2N-$ | $(n-C_3H_7)_2-N-$ | CH₃ | CH₃ | " |
| C₆H₅—NH— | C₆H₅—NH— | H | H | yellow-orange |
| cyclohexyl-N(CH₂CH₂CN)— | cyclohexyl-N(CH₂CH₂CN)— | H | H | red |
| $(n-C_4H_9)_2-N-$ | $(n-C_4H_9)_2-N-$ | CH₃ | CH₃ | red-orange |
| $CH_3NHCONH-$ | $CH_3NHCONH-$ | H | H | yellow-orange |
| cyclohexyl-NH— | cyclohexyl-NH— | H | H | orange |
| C₆H₅—NHCONH— | C₆H₅—NHCONH— | H | H | yellow-orange |
| $CH_3S-$ | $CH_3S-$ | CH₃ | CH₃ | yellow |
| C₆H₅—CONH— | C₆H₅—CONH— | H | CH₃ | orange |
| $CH_3CONH-$ | $CH_3CONH-$ | H | H | " |
| Cl—C₆H₄—CH₂O— | $CH_3O-$ | OCH₃ | H | " |
| $(NCCH_2CH_2)_2N-$ | $(NCCH_2CH_2)_2N-$ | CH₃ | CH₃ | red |
| cyclohexyl- | cyclohexyl- | OCH₃ | OCH₃ | yellow |
| $NCC_2H_4-N(CH_3)-$ | C₆H₅—CH₂O— | H | H | " |
| $CH_3NHCONH-$ | $CH_3O-$ | Cl | Cl | yellow-orange |
| $(CH_3OC(O)OC_2H_4)_2N-$ | $(CH_3OC(O)OC_2H_4)_2N-$ | H | H | orange |

TABLE 5

Structure: X—(phenyl with R7)—N=N—(phenyl with Cl)—(phenyl with Cl)—N=N—(phenyl with R8)—Y

| X | Y | R₇ | R₈ | Shade |
|---|---|---|---|---|
| $(CH_3)_2N-$ | $(CH_3)_2N-$ | H | H | yellow-orange |
| $(C_2H_5)_2N-$ | $(C_2H_5)_2N-$ | CH₃ | CH₃ | orange |
| $(CH_3)_2N-$ | $(CH_3)_2N-$ | Cl | Cl | orange |

TABLE 5-continued
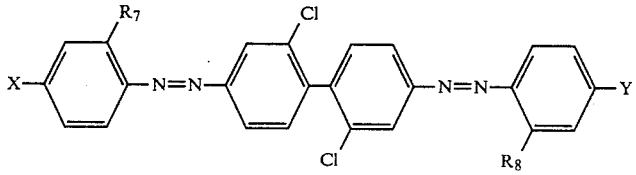
| X | Y | R₇ | R₈ | Shade |
|---|---|---|---|---|
| 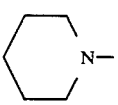 | 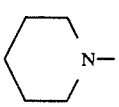 | H | H | yellow |
| 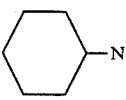 | 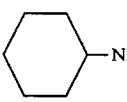 | H | H | yellow |
| (n-C₃H₇)₂N— | CH₃O— | Cl | Cl | yellow |
| 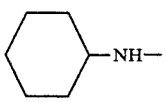 | 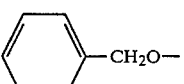 | CH₃ | H | yellow |
| (n-C₄H₉)₂N— | 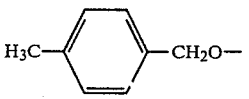 | H | H | yellow |
| (n-C₃H₇)₂N— | 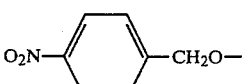 | H | H | yellow |
| (NCCH₂CH₂)₂N— | (NCCH₂CH₂)₂N— | H | H | orange |
| 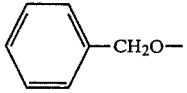 | 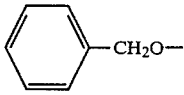 | H | H | yellow |
| CH₃O— | CH₃O— | H | H | yellow |
| 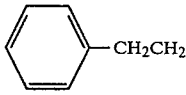 | 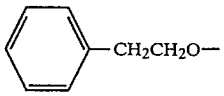 | H | H | yellow |
| CH₃O— | 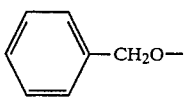 | CH₃ | H | yellow |
| 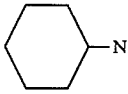 | 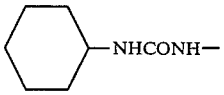 | H | H | yellow |
| (CH₃OC(O)OC₂H₄)₂N— | (CH₃OC(O)OC₂H₄)₂N— | H | H | orange |
| NCCH₂CH₂—N—<br>　　　　　　｜<br>　　　　　　CH₃ | NCCH₂CH₂—N—<br>　　　　　　｜<br>　　　　　　CH₃ | H | H | orange |

TABLE 6

$$X-\text{C}_6\text{H}_3(R_7)-N=N-\text{C}_6\text{H}_2(Cl)(Cl)-\text{C}_6\text{H}_2(Cl)(Cl)-N=N-\text{C}_6\text{H}_3(R_8)-Y$$

(biphenyl with 2,2',5,5'-tetrachloro substituents, azo-linked to two substituted phenyl rings bearing X, R$_7$ and Y, R$_8$)

| X | Y | R$_7$ | R$_8$ | Shade |
|---|---|---|---|---|
| (HOCH$_2$CH$_2$)$_2$N— | (HOCH$_2$CH$_2$)$_2$N— | H | H | orange |
| (CH$_3$)$_2$N— | (C$_2$H$_5$)$_2$N— | CH$_3$ | CH$_3$ | orange |
| (C$_4$H$_9$)$_2$N— | (C$_4$H$_9$)$_2$N— | H | H | orange-yellow |
| cyclohexyl-N(CH$_2$CH$_2$CN)— | cyclohexyl-N(CH$_2$CH$_2$CN)— | H | H | orange |
| (n-C$_3$H$_7$)$_2$N— | CH$_3$O— | H | CH$_3$ | yellow-orange |
| (C$_2$H$_5$)$_2$N— | cyclohexyl-NH— | Cl | OCH$_3$ | yellow |
| Cl—C$_6$H$_4$—CH$_2$O— | Cl—C$_6$H$_4$—CH$_2$O— | CH$_3$ | CH$_3$ | orange-yellow |
| H$_3$C—C$_6$H$_4$—CH$_2$O— | CH$_3$O— | H | H | yellow |
| C$_4$H$_9$—N(CH$_2$CH$_2$OH)— | Cl—C$_6$H$_4$—CH$_2$O— | H | H | yellow |
| CH$_3$O— | CH$_3$O— | H | H | yellow |
| C$_6$H$_5$—CH$_2$CH$_2$NH— | C$_6$H$_5$—CH$_2$CH$_2$NH— | H | H | yellow |
| C$_6$H$_5$—O—CH$_2$CH$_2$NH— | C$_6$H$_5$—OCH$_2$CH$_2$NH— | H | H | yellow |

TABLE 7

$$X-\text{C}_6\text{H}_3(R_7)-N=N-\text{C}_6\text{H}_2(CH_3)-\text{C}_6\text{H}_2(CH_3)-N=N-\text{C}_6\text{H}_3(R_8)-Y$$

(biphenyl with 2,2'-dimethyl substituents, azo-linked to two substituted phenyl rings bearing X, R$_7$ and Y, R$_8$)

| X | Y | R$_7$ | R$_8$ | Shade |
|---|---|---|---|---|
| (CH$_3$)$_2$N— | (CH$_3$)$_2$N— | H | H | orange-yellow |
| (CH$_3$)$_2$N— | (CH$_3$)$_2$N— | Cl | Cl | orange |
| (n-C$_3$H$_7$)$_2$N— | CH$_3$O— | H | CH$_3$ | yellow |
| C$_6$H$_5$—CH$_2$CH$_2$O— | C$_6$H$_5$—CH$_2$CH$_2$O— | CH$_3$ | CH$_3$ | yellow |
| (NCCH$_2$CH$_2$)$_2$—N— | (NCCH$_2$CH$_2$)$_2$—N— | H | H | orange-yellow |
| (HOCH$_2$CH$_2$)$_2$—N— | (HOCH$_2$CH$_2$)$_2$N— | H | H | yellow-orange |
| CH$_3$O— | C$_6$H$_5$—CH$_2$O— | CH$_3$ | H | yellow |

TABLE 7-continued

| X | Y | R₇ | R₈ | Shade |
|---|---|---|---|---|
| O₂N—⟨⟩—CH₂O— | O₂N—⟨⟩—CH₂O— | H | H | yellow |
| CH₃NHCONH— | CH₃NHCONH— | H | H | yellow-orange |
| CH₃O— | CH₃O— | CH₃O | CH₃O | yellow-orange |
| (n-C₄H₉)₂N— | (n-C₄H₉)₂N— | H | H | yellow-orange |
| H₃C—N—CH₂CH₂CN | H₃C—N—CH₂CH₂CN | H | H | yellow |
| ⟨⟩—N—CH₂CH₂OH | ⟨⟩—N—CH₂CH₂OH | H | H | yellow |
| Cl—⟨⟩—CH₂O— | Cl—⟨⟩—CH₂O— | H | H | yellow |
| H₃C—⟨⟩—CH₂O— | H₃C—⟨⟩—CH₂O— | H | H | yellow |
| H₃C—⟨⟩—CH₂O— | CH₃O— | CH₃ | H | yellow |
| Cl—⟨⟩—CH₂O— | (C₂H₅)₂N— | H | CH₃ | yellow |

I claim:

1. A liquid-crystal composition useful for displays comprising a liquid-crystal material having a positive dielectric antisotropy and 0.01 to 10% by weight of an azo dyestuff of the formula

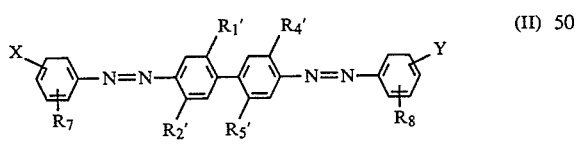 (II)

in which $R_1'$, $R_2'$, $R_4'$ and $R_5'$ designate hydrogen, halogen, $C_1$-$C_6$-alkyl $C_1$-$C_6$-alkoxy, with the proviso that at least one of these radicals is different from hydrogen, $R_7$ and $R_8$ designate hydrogen, halogen, $C_1$-$C_6$-alkyl, or $C_1$-$C_6$-alkoxy and X represents —OR₉, —SR₉ or

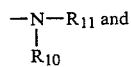

Y represents —OR₁₂, —SR₁₂ or

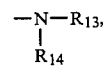

wherein $R_9$ and $R_{12}$ designate hydrogen, $C_1$-$C_6$-alkyl, cyclopentyl, cyclohexyl, phenyl, naphthyl, benzyl, phenethyl, acyl, aminocarbonyl, or benzyl which is substituted by halogen, nitro, $C_1$-$C_4$-alkyl, or $C_1$-$C_4$-alkoxy and wherein $R_{10}$, $R_{11}$, $R_{13}$ and $R_{14}$ represent hydrogen, $C_1$-$C_4$-alkyl, $C_1$-$C_4$-alkyl which is substituted by hydroxyl, cyano, phenoxy, $C_1$-$C_4$-alkoxy or by ($C_1$-$C_4$-alkoxy)-carbonyloxy, or $R_{10}$, $R_{11}$, $R_{13}$ and $R_{14}$ represent cyclohexyl, phenyl, naphthyl, benzyl, phenethyl, ($C_1$-$C_4$-alkyl)-carbonyl, benzoyl, ($C_1$-$C_4$-alkyl)-aminocarbonyl or phenylaminocarbonyl, and wherein X and Y are in the para position relation to —N═N—.

2. A liquid-crystalline material according to claim 1 having positive dielectric anisotropy and containing 0.01 to 10% by weight of an azo dyestuff of the formula

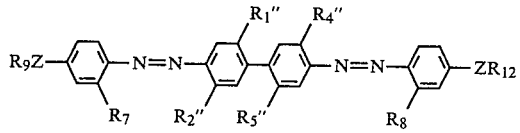

(III)

in which
Z designates an O or S atom,
$R_1''$, $R_2''$, $R_4''$ and $R_5''$ designate hydrogen, halogen, $C_1$–$C_4$-alkyl, and $C_1$–$C_4$-alkoxy with the proviso that either $R_1''$ and $R_5''$ or $R_2''$ and $R_4''$ denote hydrogen and
$R_7$, $R_8$ designate hydrogen, halogen, $C_1$–$C_6$-alkyl or $C_1$–$C_6$-alkoxy and
$R_9$, $R_{12}$ designate hydrogen, $C_1$–$C_6$-alkyl, cyclopentyl, cyclohexyl, phenyl, napthyl, benzyl, phenethyl or acyl.

3. A liquid-crystal composition according to claim 1, wherein $R_1'$, $R_2'$, $R_4'$ and $R_5'$ designate hydrogen, chlorine, methyl or methoxy.

4. A liquid-crystal composition according to claim 1, wherein said azo dyestuff is an azo dyestuff of the formula

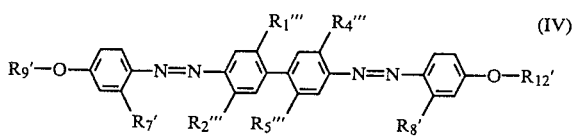

(IV)

in which
$R_1'''$, $R_2'''$, $R_4'''$, and $R_5'''$ designate hydrogen, $C_1$–$C_4$-alkyl, halogen, or $C_1$–$C_4$-alkoxy, with the proviso that one or two of these substituents differ from hydrogen and $R_9'$ and $R_{12}'$ designate $C_1$–$C_4$-alkyl, aminocarbonyl, benzyl, or benzyl which is substituted by halogen, nitro, $C_1$–$C_4$-alkyl or by $C_1$–$C_4$-alkoxy and $R_7'$ and $R_8'$ represent hydrogen, halogen, $C_1$–$C_4$-alkyl, or $C_1$–$C_4$-alkoxy.

5. A liquid-crystal composition according to claim 4 containing an azo dyestuff of formula (IV) in which $R_1'''$, $R_2'''$, $R_4'''$ and $R_5'''$ designate hydrogen, methyl, chlorine, methoxy and $R_9'$ and $R_{12}'$ designate methyl, aminocarbonyl, benzyl, or benzyl which is substituted by chlorine, nitro, methyl or by methoxy and $R_7'$ and $R_8'$ represent hydrogen, chlorine, methyl, or methoxy.

6. A liquid-crystal composition according to claim 1 wherein said azo dyestuff is an azo dyestuff of the formula

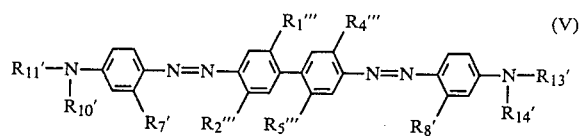

(V)

in which
$R_1'''$, $R_2'''$, $R_4'''$ and $R_5'''$ designate hydrogen, $C_1$–$C_4$-alkyl, halogen, or $C_1$–$C_4$-alkoxy with the proviso that one or two of these substituents differ from hydrogen and $R_{10}'$, $R_{11}'$, $R_{13}'$ and $R_{14}'$ represent hydrogen, $C_1$–$C_4$-alkyl, $C_1$–$C_4$-alkyl which is substituted by hydroxyl, cyano, phenoxy, $C_1$–$C_4$-alkoxy or by ($C_1$–$C_4$-alkoxy)-carbonyloxy, or $R_{10}'$ $R_{11}'$, $R_{13}'$ and $R_{14}'$ represent cyclohexyl, phenyl, naphthyl, benzyl, phenethyl, ($C_1$–$C_4$-alkyl)-carbonyl, benzoyl, ($C_1$–$C_4$-alkyl)-aminocarbonyl or phenylaminocarbonyl.

7. A liquid-crystal composition according to claim 6, wherein $R_1'''=R_5'''$ or $R_2'''=R_4'''$.

8. A liquid-crystal composition according to claim 1, which further comprises another dyestuff in admixture with the dyestuff of claim 1.

9. A liquid-crystal composition according to claim 8, wherein said another dyestuff is an anthraquinone dyestuff.

10. A liquid-crystal composition according to claim 1, wherein said azo dyestuff is present in an amount of 0.5 to 5% by weight.

* * * * *